Oct. 13, 1953 W. R. DALENBERG 2,655,135
SEAL STRUCTURE FOR USE BETWEEN A WALL
AND A PLATE ASSEMBLED THEREWITH
Filed Dec. 29, 1948
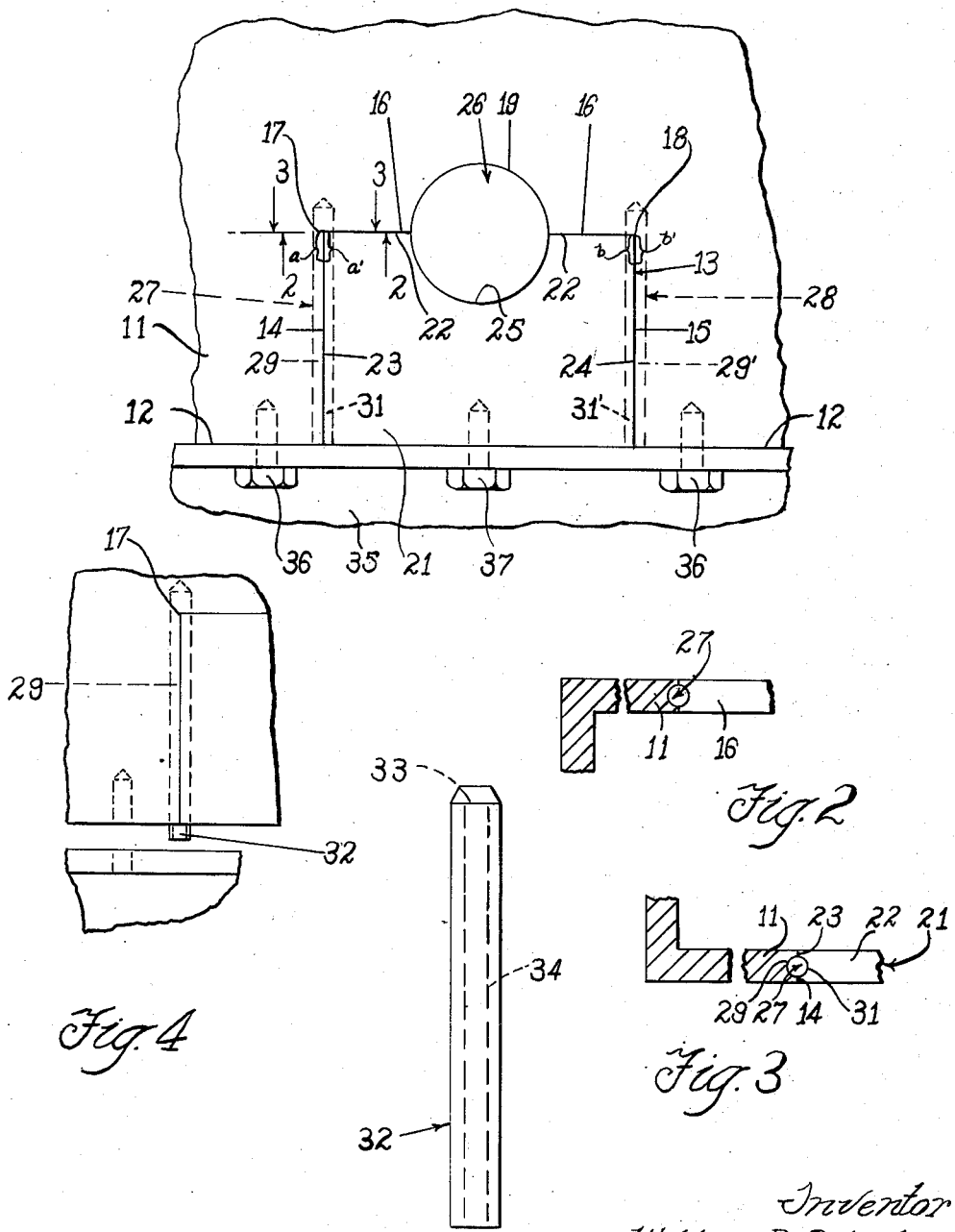
Inventor
William R. Dalenberg
Paul O. Pippel
Atty Patented Oct. 13, 1953

2,655,135

UNITED STATES PATENT OFFICE 2,655,135

SEAL STRUCTURE FOR USE BETWEEN A WALL AND A PLATE ASSEMBLED THEREWITH

William R. Dalenberg, Riverdale, Ill., assignor to International Harvester Company, a corporation of New Jersey Application December 29, 1948, Serial No. 67,943

6 Claims. (Cl. 121—194)

This invention concerns fluid-tight seals and relates more particularly to a seal structure employed in a notched wall between an edge of the notch and a plate disposed within the notch.

A seal structure embodying the principles of the present invention has particular utility when employed in an end wall structure of an internal combustion engine crank case. The conventional frame of internal combustion engines has a crank case with an end wall bearing through which an end of a crank shaft extends. This bearing is formed in two parts, one part being semi-cylindrical and being formed within an inner side of a notch which is provided in an edge of the crank case end wall. A plate which slides into said notch toward the semi-cylindrical bearing part carries a semi-cylindrical bearing part serving complementally with the first bearing part to provide the crank shaft bearing. The inner edge of the notch extending oppositely from the edges of the bearing part therein is accurately machined as is the inner edge of the plate so that these two inner edges are pressed together in self-sealing relation when the plate is inserted into the notch. The opposed inwardly extending edges of the notch have opposite end edges of the inserted plate disposed contiguously therewith. An expedient for preventing leakage of fluid between these opposite edges of the plate and the opposed inwardly extending edges of the crank case wall respectively contiguously therewith involves recesses extending inwardly from the outer edge of the plate and from the outer edge of the crank case wall in respective registry with the inwardly extending edges of the crank case wall. It has been the practice heretofore to pack these recesses with a fibrous packing material. The packing process is somewhat tedious and consequently more costly than desired. Careful workmanship is also imperative if the seal is to be highly efficient.

A general object of the present invention is the provision of a tubular sealing element of pliable elastic material insertible endwise into a recess of the above described character in lieu of the fibrous packing material. Such a sealing element and the recess for receiving the same are preferably both cylindrical and the sealing element has a diameter slightly in excess of the bore of the recess when the sealing element is in a relaxed condition wherefore, because of its elastic character, the inserted sealing element tends to expand and causes its pliable periphery to accurately conform to the cylindrical periphery of the bore and to engage the bore in firm sealing relation.

A further object of the invention is the provision of a tubular sealing element of elastic pliable material in combination with a recess as the above and wherein the sealing element is slightly longer than the depth of the recess, together with means, which is contemplated as being an edge of the crank case pan, assemblable against the edge of the crank case and the wall to force the sealing element completely into the recess and thereby cause its material to flow and incur an internally stressed condition augmenting the pressure with which the sealing element engages the cylindrical periphery of the recess.

Another object is the provision of a novel tubular sealing element of pliable elastic material.

These and other desirable objects inherent in and encompassed by the invention will be more readily understood from the ensuing description, the appended claims, and the drawings, wherein:

Fig. 1 is a fragmentary elevational view of an internal combustion engine crank case and wall together with a fragment of the crank case pan secured to an edge thereof, and illustrating the improved seal structure embodying a preferred form of the invention.

Figs. 2 and 3 are fragmentary views directed respectively upwardly and downwardly from a common horizontal plane as indicated by the arrows 2—2 and 3—3 in Fig. 1.

Fig. 4 is a fragmentary exploded view taken in elevation, illustrating one of the sealing elements and its relation to the recess in which it is inserted prior to assembly of the crank case pan with the engine frame.

Fig. 5 is a side elevational view of a tubular sealing element employed in the seal structure shown in Figs. 1 to 4.

With continued reference to the drawings and particularly to Fig. 1, an end wall of the crank case of an internal combustion engine frame is indicated at 11. This end wall has a lower edge 12, hereinafter referred to as an outer edge, containing a notch 13 bounded by spaced substantially parallel edges 14 and 15 which extend inwardly from the edge 12, and is further bounded by an inwardly disposed edge 16 which intersects the opposed edges 14 and 15 at corners 17 and 18. A semi-cylindrical bearing part 19 is formed in the edge 16.

An insert plate 21 is slid inwardly from the wall edge 12 into position within the notch 13 as illustrated in Fig. 1. This plate 21 has an inner edge 22 which is accurately machined to provide a sealing fit between the plate and the notch edge 16. Opposite edges 23 and 24 of the plate 21 are in opposed contiguous relation with the wall edges 14 and 15. Portions $a$ and $b'$ of the wall edges 14 and 15 are accurately machined as are the respectively mating edge portions $a'$ and $b$ of the plate 21, and the distance between the edge portions $a'$—$b'$ is virtually the same as the distance between the edge portions $a$—$b$ so that as these edge portions are assembled during the final movement of inserting the plate 21 into the notch 13 a semi-cylindrical bearing part 25 formed in the inner edge 22 of the plate will be accurately aligned with the bearing part 19 and so the plate will be rigidly mounted in the crank case end wall. The machining of the inwardly directed edges 14 and 15 and of the opposite edges 23 and 24 is such that slight clearance obtains between the opposed portions of these edges other than the portions $a$—$a'$ and $b$—$b'$ to facilitate insertion of the plate into the notch. This clearance is sufficiently slight, however, that the wall edges 14 and 15 pilot the plate during insertion.

The bearing parts 19 and 25 complementally provide a cylindrical bearing 26 for a crank shaft (not shown).

Two recesses, 27 and 28, are provided as elements of a seal structure between the plate 21 and the wall 11. The recess 27 extends inwardly from the outer edge 12 of the wall in registry with the edge 14 of the wall and with the edge 23 of the plate 21. Each of these recesses 27 and 28 extends inwardly beyond the inwardly disposed edge 16. The recess has a portion of its cylindrical side wall elements provided by a semi-cylindrical groove 29 in the inwardly extending wall edge 14, and a part of its side wall elements formed by a semi-cylindrical groove 31 in the plate 21; see Figs. 2 and 3. Side wall elements of the recess 28 are similarly formed by a corresponding semi-cylindrical groove 29' in the plate edge 15 and part by a semi-cylindrical groove 31' in the contiguous edge of the plate 21.

Subsequent to assembly of the plate 21 with the wall 11, identical tubular sealing elements 32 are inserted endwise into the recesses 27 and 28. The outer end of each sealing element 32 is open, whereas the inner end thereof is closed by an end portion 33 projecting radially inwardly from the inner periphery 34 thereof. These sealing elements are formed of pliable elastic material preferably one of the well-known synthetic rubber-substitute materials having resistance to deterioration when subjected to lubricants derived from petroleum. For convenience, the material possessing these physical and resistance to deterioration properties will be referred to as an elastomer. The exterior diameter of the tubular elements 32 slightly exceeds the diameter of the recesses 27 and 28 while these sealing elements are in a non-assembled relaxed condition. Each sealing element 32 is inserted into its recess by a rod (not shown) inserted endwise into the open end of the sealing element and against the radially projecting portion 33. Endwise force upon the projection 33 causes endwise elongation and attendant diminution in diameter of the sealing element as it is forced endwise into the recess for receiving the same. The inner end of each sealing element is rammed home against the inner end of its associated recess.

Subsequent to insertion of each sealing element the outer end portion thereof will project slightly from the outer end of its recess as illustrated in Fig. 4. This outwardly projecting end portion of each sealing element is forced into its recess by a thrust force applied by the upper edge of a crank case pan 35 as it is drawn into assembly with the crank case end wall 11 by cap screws 36, Fig. 1. A cap screw 37 provides a rigid connection between the crank case pan and the wall plate 21.

Crowding of the flowable, pliable resilient tubular sealing elements completely into the recesses 27 and 28 pursuant to assembly of the pan 35 with the crank case wall 11 is possible because of the space provided by the cavity in the sealing elements. Such crowding of the sealing elements into the recesses 27 and 28 further increases the internal stress therein, initially incurred by their elongation and diminished diameter attendant to their being thrust into the recesses as illustrated in Fig. 4, whereby the outer peripheries of these sealing elements are caused to conform exactly to the inner peripheries of the recesses and to engage the same under high pressure to produce a highly efficient seal preventing passage of lubricant or other fluid between the contiguous edges 14—23 and 15—24.

In addition to providing an efficient seal, these sealing elements 32 are susceptible of being quickly installed and in this respect constitute a substantial improvement with respect to the fibrous sealing material heretofore stuffed into the recesses.

Having described a single preferred embodiment of the invention with the view of clearly and concisely illustrating the same, I claim:

1. In a seal structure for a wall containing a notch within an outer edge thereof and a plate disposed within said notch, said wall having opposed edges extending inwardly from said outer edge to constitute opposite boundaries for said notch and having an inwardly disposed edge intersecting said opposite edges to constitute an inner boundary for the notch, said plate having an inner edge disposed contiguously to said inwardly disposed edge of the wall and having opposite edges respectively contiguous with said inwardly directed edges of the wall, there being recesses extending inwardly from said outer edge of the wall to and beyond said inwardly disposed edge, said recesses being in respective registry with said inwardly directed edges and each recess having a portion of its longitudinal side wall elements formed upon the associated inwardly directed edge of the side wall and another portion formed upon the associated contiguous edge of the plate, and tubular sealing elements of pliable elastic material respectively in the recesses and having peripheries conforming to the side wall elements of said recesses, and means exerting an endwise thrust upon the sealing elements in the direction urging them further into the recesses and holding them under a stressed condition pressing their peripheries against the side wall elements of the recesses.

2. In a seal structure for a wall containing a notch within an outer edge thereof and a plate disposed within said notch, said wall having opposed edges extending inwardly from said outer edge to constitute opposite boundaries for said notch and having an inwardly disposed edge intersecting said opposite edges to constitute an inner boundary for the notch, said plate having an inner edge disposed contiguously to said inwardly disposed edge of the wall and having opposite edges respectively contiguous with said inwardly directed edges of the wall, one of said inwardly directed edges having a channel therein extending lengthwise thereof, the edge of said plate contiguous with said inwardly directed edge also containing a channel extending lengthwise thereof and disposed in opposed registry with the first named channel to form a bore therewith extending inwardly of said wall and of said plate from the outer edges thereof, a tubular sealing element of pliable elastic material in said bore and having a periphery conforming to the longitudinal side wall elements of said bore, and means exerting an endwise thrust upon said sealing element in the direction urging it further into the bore and holding it under a stressed condition pressing the periphery thereof against the side wall elements of the bore.

3. The combination set forth in claim 2 wherein said channels are semi-cylindrical to effect a cylindrical bore, and wherein said sealing element is also cylindrical and has an exterior diameter slightly exceeding the diameter of said bore while the sealing element is in a relaxed condition.

4. The combination set forth in claim 3 wherein the tubular sealing element has an inner periphery, and wherein the end of said tubular sealing element disposed at the inner end of said bore has an end portion projecting radially inwardly from the inner periphery of such tubular element.

5. The combination set forth in claim 3 wherein said wall contains a cylindrical recess coaxial with the semi-cylindrical groove in the inwardly directed wall beyond said inner edge of the wall, said recess being of the same diameter as the bore jointly formed by said semi-cylindrical grooves and providing a bottom for said bore, and said sealing element being disposed with its inner end against such bottom of the bore.

6. In a seal structure for the end wall of an engine crank case containing a notch within an outer edge thereof against which an edge of a crank case pan is to be secured and a bearing holding plate disposed within said notch, said wall having opposed edges extending inwardly from said outer edge to constitute opposite boundaries for said notch and having an inwardly disposed edge intersecting said opposite edges to constitute an inner boundary for the notch, said plate having an inner edge disposed contiguously to said inwardly disposed edge of the wall and having opposite edges respectively contiguous with said inwardly directed edges of the wall, there being recesses extending inwardly from said outer edge of the wall to and beyond said inwardly disposed edge portion, said recesses being in respective registry with said inwardly directed edges and each recess having a portion of its longitudinal side wall elements formed upon the associated inwardly directed edge of the side wall and another portion formed upon the associated contiguous edge of the plate, and tubular sealing elements of pliable elastic material respectively in the recesses and having peripheries conforming to the side wall elements of said recesses, and means for securing the rim of said pan against said outer edge of the crank case end wall to press the sealing elements endwise into the recesses and hold them under a stressed condition, forcing their peripheries against the side wall elements of the recesses.

WILLIAM R. DALENBERG.

References Cited in the file of this patent

UNITED STATES PATENTS

| Number | Name | Date |
|---|---|---|
| 1,085,584 | Bond | Jan. 27, 1914 |
| 1,293,266 | Warren | Feb. 4, 1919 |
| 1,453,518 | Price | May 1, 1923 |
| 1,723,306 | Sipe | Aug. 6, 1929 |
| 2,002,211 | Torney | May 21, 1935 |
| 2,191,142 | Greening | Feb. 20, 1940 |
| 2,446,323 | Davis et al. | Aug. 3, 1948 |
| 2,475,836 | Henricksen et al. | July 12, 1949 |